United States Patent Office 3,518,239
Patented June 30, 1970

3,518,239
PREPARATION OF COPOLYMERS OF VINYL
CHLORIDE AND OXAZOLINES
John A. Frump, Terre Haute, Ind., assignor to Commercial Solvents Corporation, New York, N.Y., a corporation of Maryland
No Drawing. Filed Feb. 14, 1968, Ser. No. 705,280
Int. Cl. C08f 1/13, 19/00
U.S. Cl. 260—87.5          3 Claims

ABSTRACT OF THE DISCLOSURE

A process for the aqueous emulsion polymerization of vinyl chloride and an oxazoline of the formula

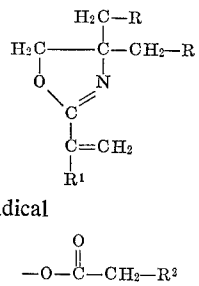

wherein R is the radical

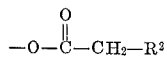

hydrogen, a lower alkyl radical having 1 up to about 3 carbon atoms or the hydroxyl radical, $R^1$ is an alkyl radical having, for example, 1 up to about 24 carbon atoms, and $R^2$ is hydrogen or an alkyl radical having, for example, 1 up to about 24 carbon atoms, by, polymerizing vinyl chloride and the said oxazoline in an aqueous emulsion polymerization medium containing stabilizing amounts of 2-amino-2-methyl-1-propanol.

Background of the invention

This invention relates to a process for the preparation of copolymers of vinyl chloride and an oxazoline of the formula

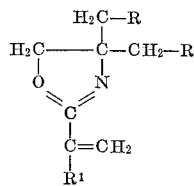

wherein R is the radical

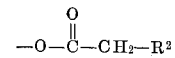

hydrogen, a lower alkyl radical having 1 up to about 3 carbon atoms or the hydroxyl radical, $R^1$ is an alkyl radical having, for example, 1 up to about 24 carbon atoms, and $R^2$ is hydrogen or an alkyl radical having, for example, 1 up to about 24 carbon atoms, the defined oxazoline being hereinafter referred to as "vinyl oxazoline." In a particular aspect, this invention relates to an improved process for preparing copolymers of vinyl chloride and vinyl oxazoline by aqueous emulsion polymerization in the presence of stabilizing amounts of 2-amino-2-methyl-1-propanol.

In co-pending application Ser. No. 563,352, now Pat. No. 3,380,975, filed by Robert F. Purcell on July 7, 1966, it is disclosed that vinyl chloride and vinyl oxazoline can be copolymerized. The obtained polymerization products are heat stable and thereby provide polyvinyl chloride stabilized against heat degradation. As described therein, the polymers may be prepared in any one of the following four manners: (a) emulsion, (b) suspension, (c) bulk, and (d) solution. In the emulsion polymerization procedure, a stable aqueous emulsion containing the polymerization product is not obtained. The polymerization product tends to agglomerate and form masses which separate from the emulsion. This results in difficulty in recovering the polymer from the polymerization medium.

Summary of the invention

It is an object of the present invention to provide a process for preparing copolymers of vinyl chloride and vinyl oxazoline.

It is a further object of the present invention to provide an improved process for the preparation of copolymers of vinyl chloride and vinyl oxazoline by aqueous emulsion polymerization whereby a stable aqueous emulsion from which the copolymer is easily recovered is obtained.

Other objects and advantages of the present invention will be apparent from the specification and appended claims.

It has been discovered in accordance with the present invention that stable aqueous emulsions containing copolymers of vinyl chloride and vinyl oxazoline are prepared by polymerizing vinyl chloride and vinyl oxazoline in an aqueous emulsion polymerization medium containing a stabilizing amount of 2-amino-2-methyl-1-propanol.

Detailed description

The polymerization procedure of the present invention is effected in the known manner by polymerizing in an aqueous emulsion polymerization medium an admixture of vinyl chloride and vinyl oxazoline, the polymerization medium containing emulsion stabilizing amounts of 2-amino-2-methyl-1-propanol. The polymerization is generally conducted at a temperature of from about 30 to about 80° C. The polymerization time varies, depending upon such factors as the temperature, catalysts, amounts of catalysts, etc. Typically, the polymerization is complete in from about 12 to about 48 hours.

The aqueous polymerization medium is comprised of water, an emulsifying agent and a polymerization catalyst. Suitable emulsifying agents are well known to the art and include the alkylarylpolyether alcohols, sodium caprylate, lead stearate, sodium oleate, disodium dodecylated oxydibenzene sulphonate and the like. The amount of emulsifying agent may vary and, typically, will range from about 0.02 to about 0.2% by weight, based on the weight of the polymerizable material. Polymerization catalysts are also well known to the art and include the organic peroxides, azo compounds and redox systems. Amounts of polymerization catalysts in the range of from about 0.05 to about 5.0% by weight, based on the weight of the polymerizable material, are typically employed.

The amount of 2-amino-2-methyl-1-propanol employed in the process is an important feature of the present invention and should be sufficient to satisfactory stabilize the emulsion. Amounts in the range of from about 0.3 to about 1.0% by weight, based on the weight of the polymerizable material, generally have been found to give satisfactory results, with amounts in the range of from about 0.5 to about 0.8% being preferred.

The weight ratio of vinyl chloride to vinyl oxazoline may vary over a wide range, with a ratio of vinyl chloride to vinyl oxazoline of in the range of 200:1 to about 3:1 being typically employed. The polymerization may be conducted in conjunction with other polymerizable monomers, such as vinylidene chloride, acrylonitrile, styrene, vinyl esters of aliphatic acids, for example dialkyl maleate and fumarate, vinyl acetate, the acrylics and arcylic esters, such as ethyl acrylate, methyl acrylate, acrylic acid, mtehacrylic acid, and the like. In any case, the total of the vinyl chloride and vinyl oxazoline monomers comprises the major portion of the polymerizable material.

The vinyl oxazolines used in the present invention are commercailly available and may be obtained by the reaction of an aminohydroxy compound, an organic carboxylic acid and an aldehyde. A method for preparing such vinyl oxazolines is disclosed in application Ser. No. 254,010, now abandoned, filed Jan. 21, 1963 for H. L. Wehrmeister and H. I. Yalowitz. Examples of such oxazolines include 2-isopropenyl-4-hydroxymethyl-4-ethyl-2-oxazoline, 2-isopropenyl-4-propionyloxymethyl-4-ethyl-2-oxazoline, 2-isopropenyl-4,4-dimethyl-2-oxazoline, 2-isopropenyl - 4 - hydroxymethyl-4-methyl-2-oxazoline, 2-isopropenyl-4-propionyloxymethyl-4-methyl - 2 - oxazoline, 2-isopropenyl - 4,4 - bis (hydroxymethyl) - 2 - oxazoline- 2-isopropenyl-4,4 - bis(propionyloxymethyl) - 2 - oxazoline, 2-isobutenyl-4-hydroxymethyl-4-ethyl - 2 - oxazoline, 2-(1-hexadecylvinyl)-4,4-bis(stearyloxymethyl) - 2 - oxazoline, 2-(1-hexadecylvinyl) - 4,4 - bis(hydroxymethyl)- 2-oxazoline, 2-(1-eicosylvinyl) -4,4 - dimethyl-2-oxazoline, 2-(1-heptylvinyl)-4,4-bis(hydroxymethyl) - 2 - oxazoline, etc., and the like.

The invention will be understood more fully by reference to the folowing specific examples. It is understood that the examples are presented for the purpose of illustration only and are not intended as a limitation of the invention.

about 58° C. for 17 hours. The pH of the aqueous emulsions upon completion of polymerization in all cases was lower than 6.0. Stable uniform aqueous emulsions were obtained.

TABLE

| | Amount of ingredient | | | | |
|---|---|---|---|---|---|
| Example No | 2 | 3 | 4 | 5 | 6 |
| Water | 72.0 grams | 72.0 grams | 72.0 grams | 72.0 grams | 68.0 grams |
| Vinyl chloride | 45.0 grams | 40.0 grams | 43.0 grams | 43.0 grams | 43.0 grams |
| Vinyl oxazoline | 5.0 grams | 10.0 grams | 2.5 grams | 2.5 grams | 2.5 grams |
| Vinyl acetate | | | 4.5 grams | 4.5 grams | 4.5 grams |
| Triton X-100 | 60 ml. of 2.5% solution | 60 ml. of 2.5% solution | 60 ml. of 2.5% solution | 60 ml. of 2.5% solution | 60 ml. of 2.5% solution |
| Siponate DS-10 | do | do | do | do | Do. |
| KHSO₃ | 4 ml. of 0.8377% solution | 4 ml. of 0.8377% solution | 4 ml. of 0.8377% solutiou | 4 ml. of 0.8377% solution | 4 ml; of 0.8377% solution |
| K₂S₂O₈ | 4 ml. of 4.1650% solution | 4 ml. of 4.1650% solution | 4 ml. of 4.1650% solution | 4 ml. of 4.1650% solution | 4 ml. of 4.1650% solution |
| 2-amino-2-methyl-1-propanol | 0.40 gram | 0.40 gram | 0.40 gram | 3.0 ml. of 10% aqueous solution | 5.0 ml. of 10% aqueous solution |

EXAMPLE 1

A mixture of 72 grams of water, 47.5 grams of vinyl chloride, 2.5 grams of 2-isopropenyl-4-propionyloxymethyl-4-ethyl-2-oxazoline, 60 ml. of a 2.5% aqueous solution of Triton X-100 (octylphenoxypolyethoxyethanol), 60 ml. of a 2.5% aqueous solution of Siponate DS-10 (dodecylbenzenesulphonate), 4 ml. of a 0.8377% aqueous solution of KHSO₃, 4 ml. of a 4.1650% aqeous solution of K₂S₂O₈ and 0.4 gram of 2-amino-2-methyl-1-propanol was placed in a capped, 16 ounce Coca-Cola¹ bottle. The contents of the bottle was agitated at a temperature of about 58° C. for 17 hours. At the completion of the 17 hour period the contents was cooled and removed from the bottle. A stable uniform aqueous emulsion of vinyl chloride-vinyl oxazoline copolymer was obtained. The emulsion had a pH of 6.0.

The copolymer was recovered as follows. The aqueous emulsion was evaporated to dryness in an oven at about 95° C. The dry polymer was then washed with boiling water and filtered. The filtered polymer was then dried with an infrared heat lamp in a vacuum desiccator. A dry polymer physically resembling polyvinyl chloride was obtained.

EXAMPLES 2–6

A series of aqueous polymerizations with vinyl chloride, vinyl oxazoline and 2-amino-2-methyl-1-propanol were conducted. The vinyl oxazoline employed was 2-isopropenyl-4-propionyloxymethyl-4-ethyl-2-oxazoline. The polymerizations were carried out at a temperature of ¹ Coca-Cola is a trademark of the Coca-Cola Company.

EXAMPLE 7

The procedure of Example 1 is repeated in all essential details with the exception that 2-isopropenyl-4-hydroxymethyl-4-ethyl-2-oxazoline is used instead of 2-isopropenyl-4-propionyloxymethyl - 4 - ethyl-2-oxazoline to obtain a stable uniform aqueous emulsion of the copolymer.

EXAMPLE 8

The procedure of Example 1 is repeated in all essential details with the exception that 2-(1-hexadecylvinyl)-4,4-bis(stearyloxymethyl)-2-oxazoline is substituted for 2-isopropenyl-4-propionyloxymethyl-4-ethyl-2-oxazoline to obtain a stable uniform aqueous emulsion of the copolymer.

Since many changes may be made in this invention and since many changes may be made in the embodiments described, the foregoing is to be interpreted as illustrative only and the invention is defined by the claims appended hereto.

I claim:

1. In an aqueous emulsion polymerization process for the polymerization of copolymerizable monomers comprising vinyl chloride and an oxazoline of the formula

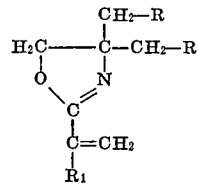

wherein R is hydrogen, the radical

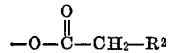

a lower alkyl radical having 1 up to about 3 carbon atoms or the hydroxyl radical, $R^1$ is an alkyl radical, and $R^2$ is hydrogen or an alkyl radical, the improvement comprising carrying out the said polymerization in the presence of a stabilizing amount of 2-amino-2-methyl-1-propanol.

2. The process of claim 1 wherein the amount of 2-amino-2-methyl-1-propanol is in the range of from about 0.4 to about 1.0% by weight, based on the total weight of the copolymerizable monomers.

3. The process of claim 2 wherein the amount of 2-amino-methyl-1-propanol is in the range of from about 0.5 to about 0.8.

References Cited

UNITED STATES PATENTS 3,380,975   4/1968   Purcell _____ 260—87.5

JOSEPH L. SCHOFER, Primary Examiner

J. A. DONAHUE, JR., Assistant Examiner

UNITED STATES PATENT OFFICE
CERTIFICATE OF CORRECTION

Patent No. 3,518,239          Dated June 30, 1970

Inventor(s) John A. Frump

It is certified that error appears in the above-identified patent and that said Letters Patent are hereby corrected as shown below:

Column 1, lines 44-46, that portion of the formula reading O    N should read -- O    N --.

Column 2, line 72, "Mtehacrylic" should be --methacrylic--.
Column 3, line 40, "folowing" should be --following--.
Column 4, in the table, fifth column, last item "aque-" should be --aqueous--;
    line 67, "2-amino-methyl" should be --2-amino-2-methyl--.

SIGNED AND
SEALED
MAR 2 1971

(SEAL)
Attest:

Edward M. Fletcher, Jr.
Attesting Officer

WILLIAM E. SCHUYLER, JR.
Commissioner of Patents